United States Patent [19]

Herter

[11] 3,813,811
[45] June 4, 1974

[54] PHEASANT CALL
[75] Inventor: George L. Herter, Waseca, Minn.
[73] Assignee: Herter's, Inc., Waseca, Minn.
[22] Filed: Feb. 2, 1972
[21] Appl. No.: 222,901

[52] U.S. Cl. ................................................ 46/180
[51] Int. Cl. ............................................. A63h 2/28
[58] Field of Search ................... 46/178, 180, 189

[56] References Cited
UNITED STATES PATENTS

| 677,113 | 6/1901 | Bruce | 46/178 |
|---|---|---|---|
| 1,146,640 | 7/1915 | Miller | 46/180 |
| 2,782,558 | 2/1957 | Harley | 46/180 |
| 2,912,791 | 11/1959 | Cohen | 46/178 X |
| 2,988,848 | 6/1961 | Lemelson | 46/180 |

Primary Examiner—Robert Peshock
Assistant Examiner—D. L. Weinhold

[57] ABSTRACT

A sound-producing call to simulate the cackling of a pheasant including a call body with an air passage having a reed therein, a bladder attached to the call body, and a slitted diaphragm between the bladder and the air passage of the call body.

1 Claim, 2 Drawing Figures

PATENTED JUN 4 1974 3,813,811

PHEASANT CALL

SUMMARY OF THE INVENTION

The pheasant call constituting the present invention is, in certain respects, similar to other types of calls or sound-producing devices and has an elongate, and generally tubular body with an air passage extending entirely through the body so that air received at the inlet end will operate a sound-generating reed within the call body and the sound produced will be emitted at the opposite end. The reed used in the call body is relatively low pitched so that the tone produced will generally simulate the tone range of a pheasant.

The call uses a collapsible bladder for supplying air into the inlet end of the air passage for operating the reed, and the present invention utilizes a membrane or diaphragm across the inlet end of the call body and substantially obstructing the air passage in the call body. The diaphragm or membrane has its periphery in sealed relation to the end of the call body, and the membrane has an elongate slit extending substantially diametrically across the air passage of the call. The slit is open in a normal position, but very substantially obstructs the flow of air. When the air pressure is developed by deforming the bladder, the first flow of air through the slit will not be adequate to operate the reed, but when sufficient pressure has been developed to open the slit, the reed will suddenly be vibrated so as to produce a loud and scheeching sound screeching the manner that the call of the natural pheasant is started. After a substantial quantity of the air is forced out of the bladder, the pressure will drop in the bladder and the membrane will quickly close the slit so as to suddenly stop the flow of air across the reed and the sound being produced will suddenly stop in the fashion of a natural pheasant. The operator of this pheasant call can, with only a limited amount of practice, produce sounds through the use thereof, and emitted from the end of the sound body, which very nearly simulate the cackling or call of the natural pheasant.

BRIEF DESCRIPTION OF THE DRAWINGS

FIG. 1 is an elevation view, partly broken away and shown partly in section for clarity of detail.

DETAILED DESCRIPTION OF THE INVENTION

Figure 2:
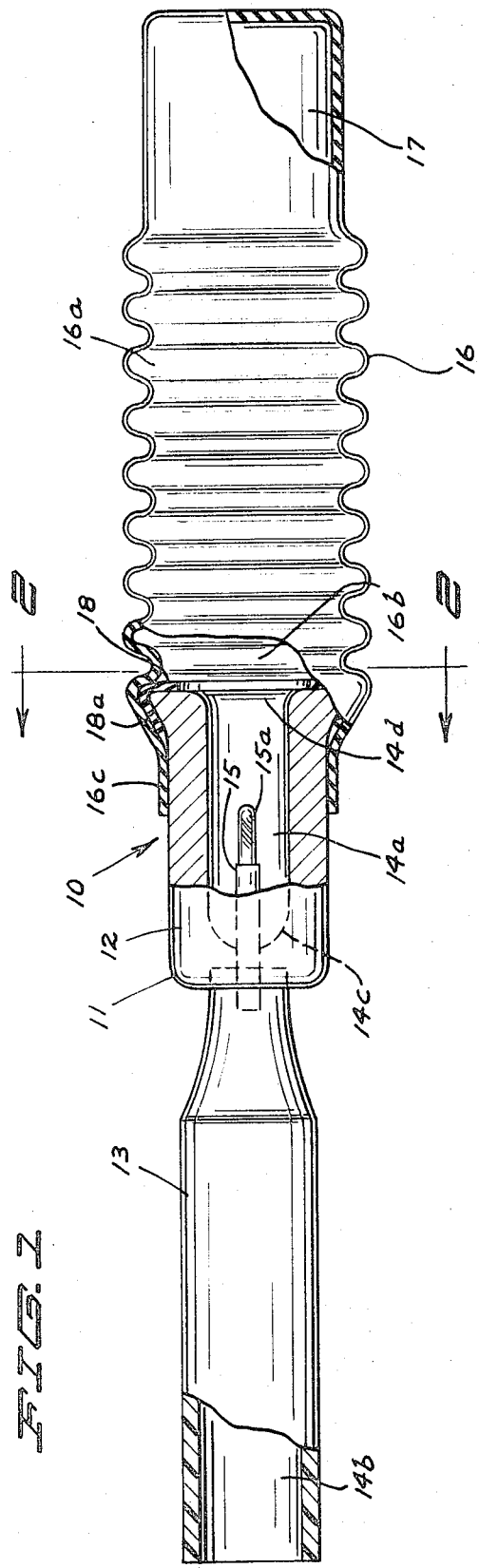
FIG. 2 is an enlarged detail transverse section view taken approximately at 2—2 in FIG. 1.
Figure 3:
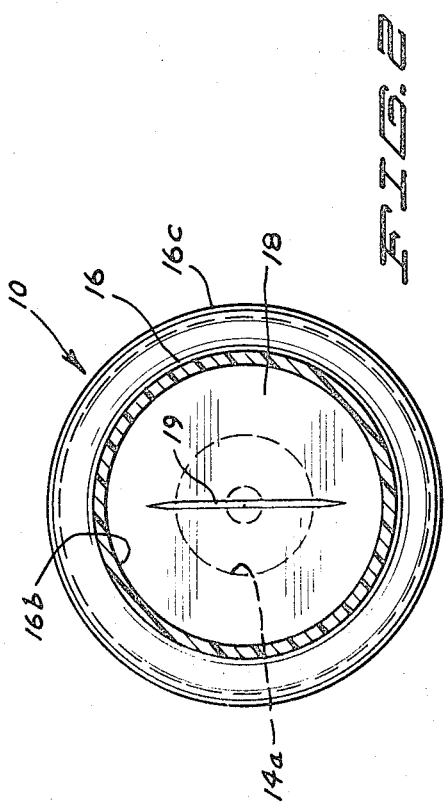

The pheasant call is indicated in general by the numeral 10 and has a call body 11 including a tubular wooden mouthpiece 12 and a plastic tube 13 fitted to the end of the mouthpiece 12. The entire call body is substantially hollow in configuration so as to define an air passage 14a, 14b extending entirely therethrough. The opening 14a within the mouthpiece 12 is tapered to a reduced diameter at 14c and mounts a reed structure 15 so that the vibrating reed 15a is adjacent the entire flow of air through the call body 11 and will be put into vibration when such air is moved through the call body. The call 10 is provided with a bellows type elongate rubber bladder 16 which might be formed of some other type of resiliently deformable material. The bladder 16 extends from the mouthpiece 12 of the call body, adjacent the inlet end 14d of the air passage. The bladder 16 is readily collapsible under manual pressure and defines a constrictable interior air chamber 17 from which the air is expelled when the bladder 16 is collapsed. The corrugated configuration in the peripheral sidewall 16a of the bladder is particularly useful because the bladder 16 may be quickly and almost completely collapsed with endwise pressure applied thereto. The outlet end 16b of the bladder is disposed in air delivery communication with the air passage of the call body 11, and the peripheral end 16c of the bladder is in encompassing relation with the exterior periphery of the mouthpiece 12. The end 16c of the bladder resiliently grips the mouthpiece 12 in sealing relation so that all of the air from the bladder will be expelled into and through the call body 11.

The call 10 is also provided with a resiliently flexible membrane or diaphragm 18 which may be formed of any suitable material such as rubber, of the same general nature as the rubber in the bladder 16, but the membrane 18 may be somewhat lighter if desired. The peripheral edge 18a of the membrane is stretched over the periphery of the mouthpiece 12 in gripping and sealing relation so as to maintain the membrane 18 in predetermined relation with the inlet end 14d of the air passage. The membrane 18 has an elongate slit 19 extending generally diametrically across the inlet end of the air passage 14a, and it will be noted in FIG. 2, that the ends of the slit 19 extend outwardly beyond the peripheral edge of the inlet 14d of the air passage.

The slit is normally partly open, substantially as depicted in FIG. 2, with the edges of the membrane, which define the slit, being spaced slightly from each other.

Because of the resilient nature of the membrane 18, the slit 19 will remain as a substantial restriction to flow therethrough and through the air passage 14a for operating the sound-producing reed under most low flow or low pressure conditions in the bladder 16. However, the slit 19 of the membrane will open substantially when the bladder 16 is collapsed and substantial air pressure is produced within the chamber 17 so that when the pressure is created in the chamber 17, the sound-producing reed will suddenly be put into operation to simulate the beginning of a cackle or the call of a natural pheasant. While the pressure within the chamber 17 is maintained by continued collapsing of the bladder 16, air is discharged into the reed apparatus or structure and the sound continues.

When the air pressure in the chamber 17 is reduced, the membrane 18 quickly closes the slit 19 to its original position so as to substantially restrict the flow of air through the air passages and to suddenly stop the sound being produced by the sound-generating reed structure. This also simulates the manner in which the cackling or call of a natural pheasant terminates the sound produced by it.

In the use and operation of this pheasant call, the bladder 16 may be manipulated in any of a number of ways so as to produce a rapid succession of suddenly started and suddenly terminated sounds. The call 10 may be held in a person's hand and he may press the end of the bladder against his leg, or he may lay the side of the bladder against his leg and manipulate the call so as to collapse the bladder sufficiently to produce a succession of suddenly started and suddenly terminated sounds simulating the cackling of a natural pheasant. It may be that the terminal end of the bladder may be placed against the person's legs and then the call will be wiggled from side to side and this likewise produces a succession of pressure conditions within the chamber 17 as to cause the membrane to suddenly open the slit allowing the reed to be operated and then suddenly closing the slit so as to cause the reed to be suddenly stopped. It has been found that only a minimum of experience is required to produce the desired results through the use of this call. Once a person has heard the sound of a natural pheasant, a rapid succession of very raspy or coarse sounding tones, he can very closely simulate this sound of the natural pheasant with pheasant call 10.

It will be seen that this invention includes a pheasant call with a hollow body and a sound-generating reed structure, and a collapsible bladder to define a constrictable air chamber for forcing air through the sound body and the reed structure; a membrane with a slit in it and obstructing the inlet end of the air passage in the call body so that substantial pressure within the bladder is required in order to open the slit in the membrane sufficiently so as to suddenly start the sound generation at a relatively loud output level, and then, when the sound is reduced in the air chamber of the bladder, the membrane will suddenly substantially restrict the air passage through it, or the slit will be suddenly closed to the original condition shown in FIG. 2 and the production of sound at the reed structure is suddenly terminated. By operation of this call and production of a succession of such sounds, the cackling or call of the natural pheasant can be readily and easily simulated.

What is claimed is:

1. A sound-producing call to simulate the cackling of a pheasant, comprising:

an elongate and rigid call body having an elongate air passage therethrough, the passage having an air inlet to receive sound-generating air and also having a sound-emitting end;

a sound-generating reed disposed in the air passage and anchored to the call body, said reed producing sounds in response to movement of air through the passage and having sound-generating characteristics to produce sounds in the tone range of a natural pheasant;

an elongate and collapsible bladder defining a constrictable air chamber, the bladder having an open end encompassing the call body in sealed relation therewith and in air delivery communication with the inlet end of the air passage; and a resiliently flexible membrane stretched over the end of the call body and traversing the inlet end of the air passage, the periphery of the membrane being affixed to the call body in air sealing relation, the membrane having an elongate slit extending diametrically of the air inlet of the call body, said membrane having edges defining the slit and normally disposed in confronting and spaced relation with each other, the membrane restraining passage of air through the slit and air passage until sufficient air pressure is developed in the bladder to suddenly deform the membrane and open the slit and pass a quantity of air to produce sound at the reed, the membrane suddenly closing the slit again to suddenly restrict air passage and suddenly discontinue sound production as the pressure of air in the bladder is reduced.

* * * * *